United States Patent [19]

Seitz

[11] Patent Number: 5,341,533
[45] Date of Patent: Aug. 30, 1994

[54] MODULAR RAMP

[76] Inventor: Jack Seitz, 1732 Sawmill Rd., Cottonwood, Ariz. 86326

[21] Appl. No.: 8,744

[22] Filed: Jan. 25, 1993

[51] Int. Cl.$^5$ .............................. E01D 1/00
[52] U.S. Cl. ........................ 14/69.5; 254/88
[58] Field of Search ............... 14/69.5, 71.1, 2.4; 414/537; 244/137.1; 193/38, 41; 254/88

[56] References Cited

U.S. PATENT DOCUMENTS

| | | | |
|---|---|---|---|
| 1,493,475 | 5/1924 | Cook | 254/88 |
| 2,436,467 | 2/1948 | Winter | 414/537 |
| 4,920,596 | 5/1990 | Stevens | 254/88 X |
| 4,945,595 | 8/1990 | Meriweather | 14/69.5 |

OTHER PUBLICATIONS

Page from catalog published by PEMKO Company, Ventura Calif. 93003 Showing various door thresholds.

Primary Examiner—Ramon S. Britts
Assistant Examiner—James A. Lisehora

[57] ABSTRACT

A modular ramp comprises multiple sections which, except for height, have the similar cross-section and length along the ramp. Each modular section has a groove on one edge and a lip on the oppose edge which engage mating features of the preceding and following sections. In a preferred embodiment for USA standard construction dimensions, each section is 6 inches long and has a rise of ½ inch. Thus, by joining different numbers of modular sections, a ramp with a 1:12 slope is provided which matches any existing curb, step or threshold height within ¼ inch, i.e., easily surmounted by a wheel chair. The modular sections are conveniently prefabricated and provided in kit form, the number of sections corresponding to the desired ramp height. The kit is assembled at the job site without waste material or custom fitting.

5 Claims, 3 Drawing Sheets

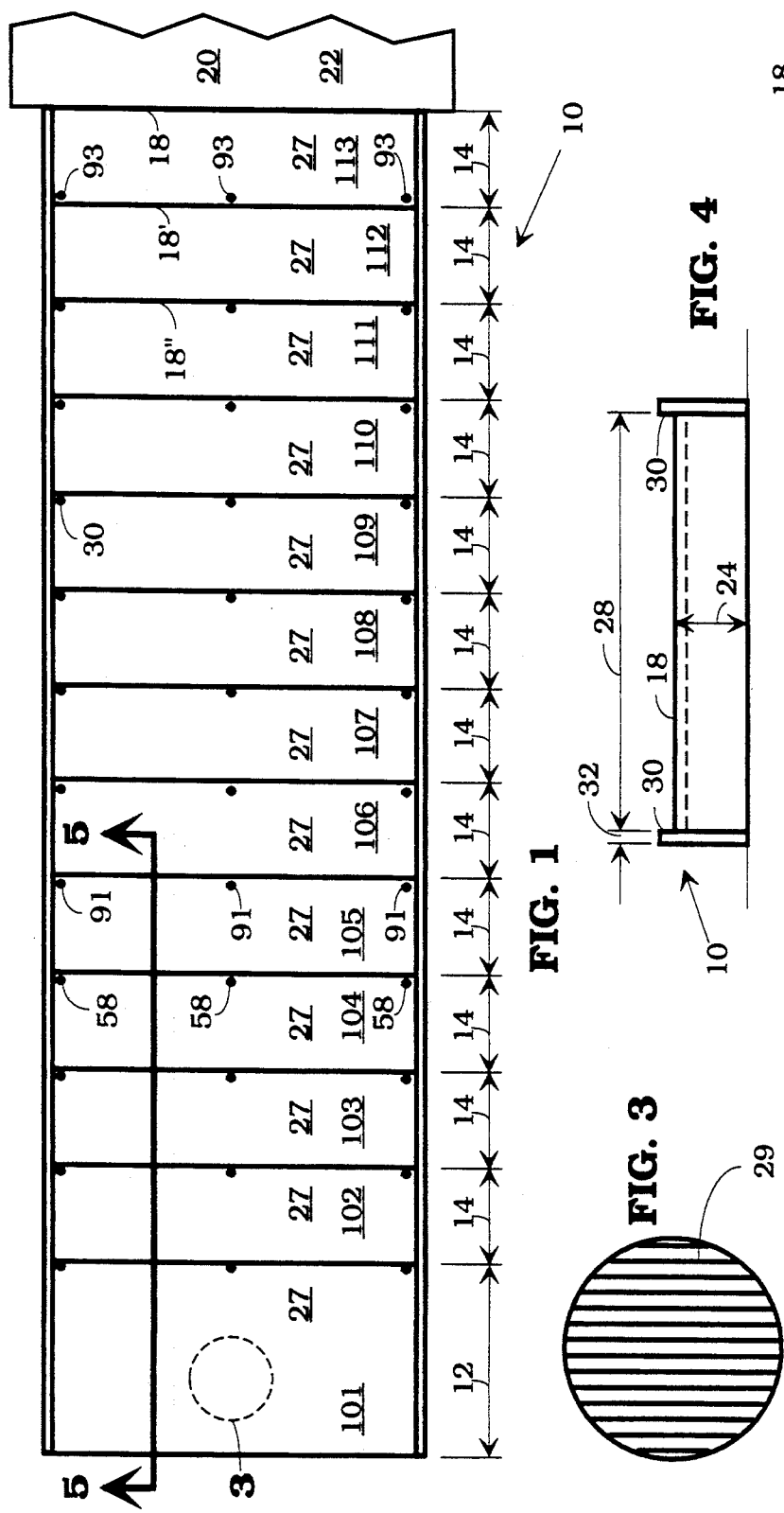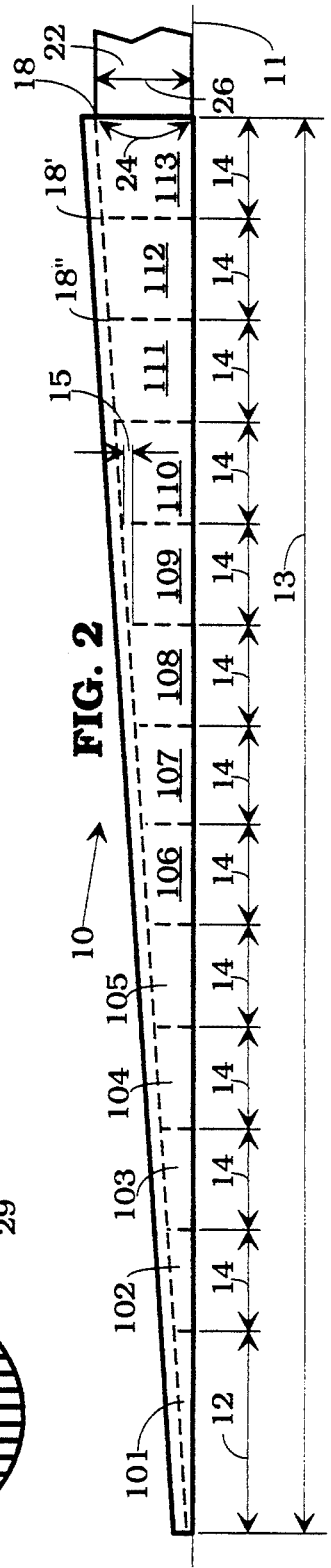

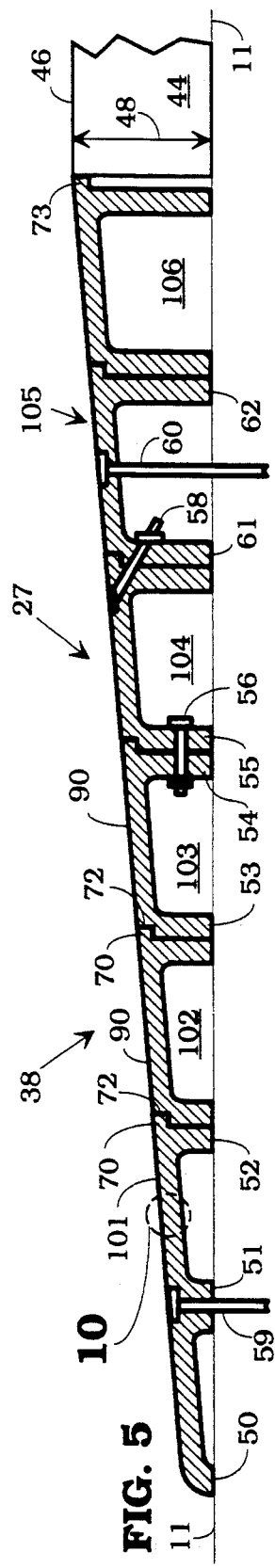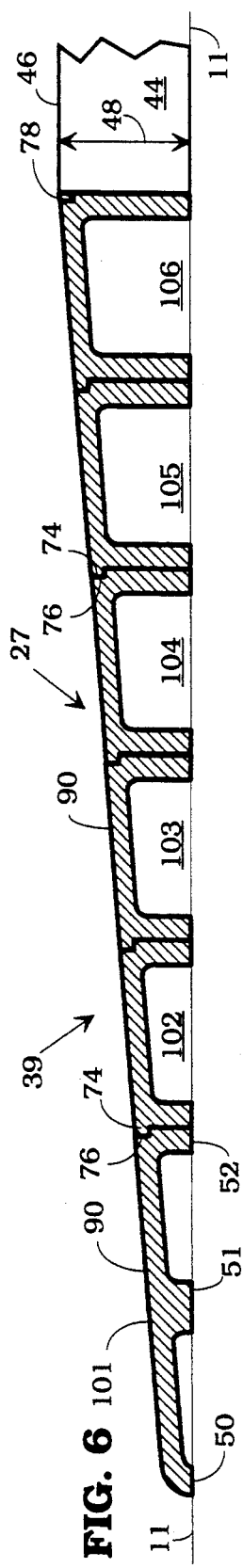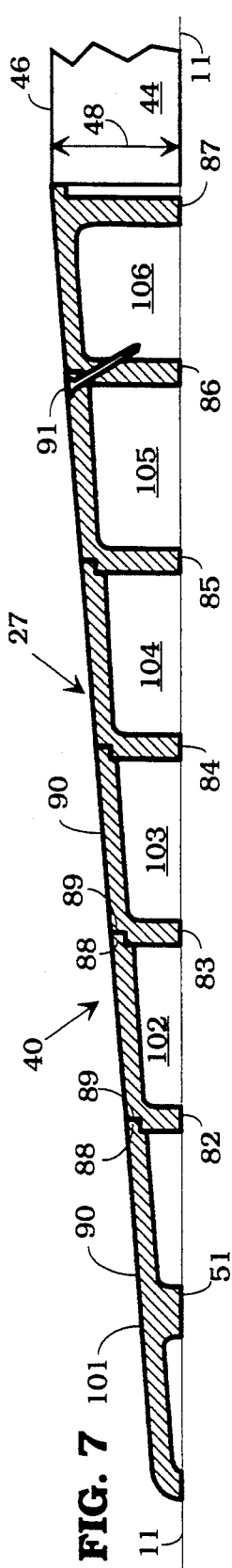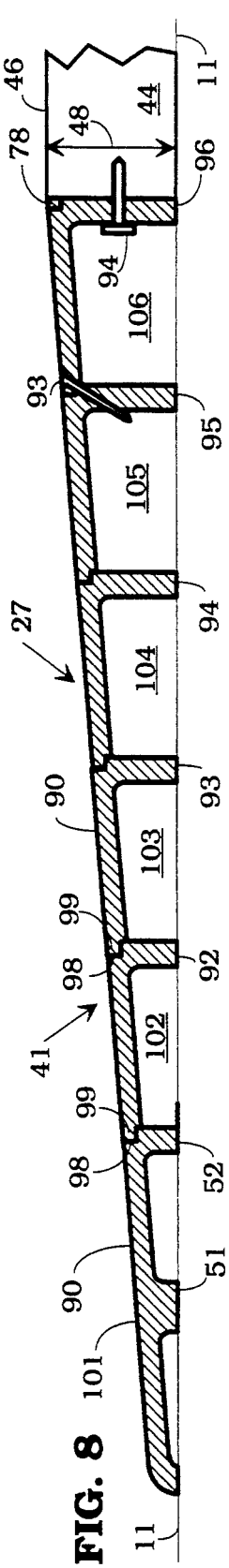

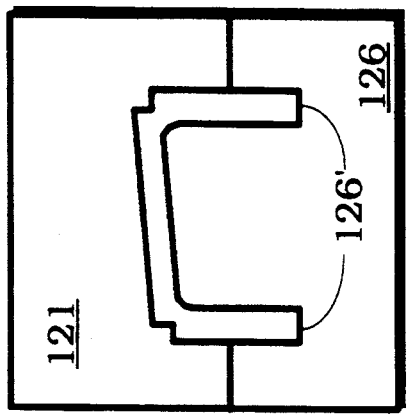
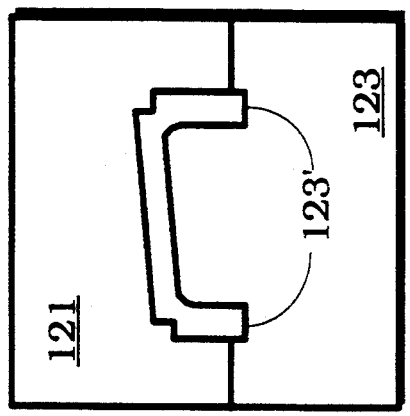
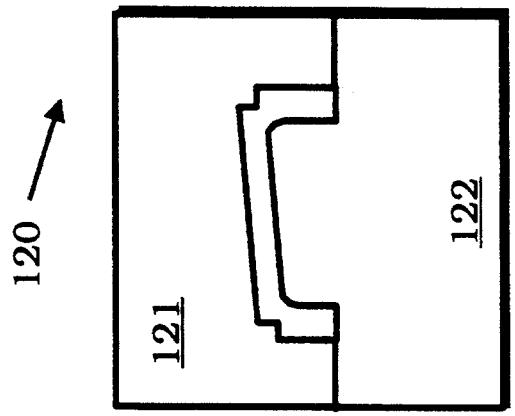
FIG. 11
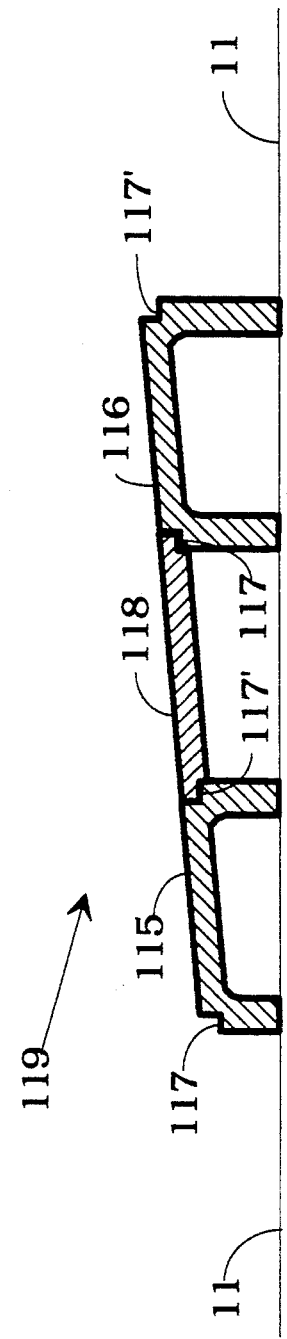
FIG. 9
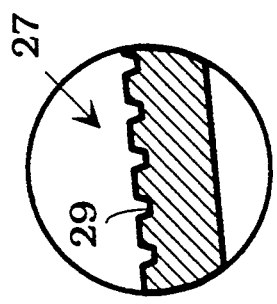
FIG. 10

MODULAR RAMP

FILED OF THE INVENTION

This relates to ramps suitable for use by wheeled chairs, carts, tables and the like and more particularly, ramps adapted to match a variety of curb, step or threshold heights.

BACKGROUND OF THE INVENTION

For many years it has been customary to provide curbs and/or thresholds which a person entering an area or building must step on or over. However, if the person desiring to enter is in a wheel chair or must move a wheeled cart or table into the area or building, such curbs, steps and thresholds can present a major problem. In recognition of this, the United States Congress recently passed the Americans with Disabilities Act (ADA) requiring that public buildings be designed or modified to provide wheel chair access. The ADA is not limited to just new construction but applies to existing public and commercial buildings as well.

When designing a new building, it is relatively straight forward to avoid curbs, steps and thresholds that would block wheel chair access. But with existing buildings, the situation is more difficult. Many public buildings that must be brought into conformance with the ADA were constructed years ago without thought to providing wheel chair access. The buildings and their surrounding walk-ways and parking lots are full of curbs, steps and thresholds that makes wheel chair access difficult. In general, most of these curbs, steps and thresholds cannot be easily removed at reasonable cost. The usual fix is to provide a ramp which makes a smooth transition up to or over the curb, step or threshold. But, there is a great variety in the heights and shapes of such curbs, steps and thresholds so that almost every ramp must have different dimensions. The result is that retro-fitting existing buildings becomes extremely expensive since almost every ramp must be individually constructed at the job sight to fit the particular space in which it will be used using general purpose raw materials. With prior art approaches it is very difficult to achieve economies of scale in the manufacture and/or the installation of such retrofit ramps. Thus, there continues to exist a need for an improved ramp and method adapted to easily retrofit existing structures with ramps that comply with the ADA requirements for access by wheel chairs and/or other wheeled carts and tables.

SUMMARY OF THE INVENTION

There is provided, most generally, a modular ramp, comprising, a plurality of separate sections which form a continuous ramp when assembled edge to edge, wherein central sections have substantially similar length along the ramp between opposed first and second edges, the first and second edges of a section being different in height, and wherein when sections are placed edge to edge with adjacent edges having the same height, the combined sections form the continuous ramp.

In a preferred embodiment, there is provided a lip or groove near the first edge and a groove or lip near the second edge, the groove of one section engaging the lip of the adjacent section when the sections are joined. There may be one or more supporting members per section, With two (or more) supporting members per section, they are preferably located adjacent each edge with one taller than the other. With this configuration, each section is self-supporting. With only one supporting member per section, then the lip of one section is supported by the groove of the adjacent section, or vice versa.

The ramp sections desirably have different heights, but substantially the same cross-section in a plane parallel to their length along the ramp. When arranged together, the height of an up-hill edge of one section matches the height of a down-hill edge of the next section, so that a continuous ramp is formed. In a preferred embodiment, the ramp sections have about a half-inch rise per section and a length (along the ramp) of about six inches per section. In this way, any curb or step or threshold height can be accommodated within $\frac{1}{4}$ inch by assembling the appropriate number of modular sections and the resulting ramp has a 1:12 slope which is desirable for wheel chairs and the like.

BRIEF DESCRIPTION OF THE FIGURES

FIG. 1 is a simplified plan view of a modular ramp according to the present invention, shown in position leading to a step;

FIG. 2 is a side view of the ramp of FIG. 1;

FIG. 3 is a plan view showing further detail of a portion of the exposed surface of the ramp of FIG. 1;

FIG. 4 is and end view of the taller end of the ramp of FIGS. 1–2;

FIG. 5–9 are simplified cross-sectional views of a few sections of the ramp of FIGS. 1–2, shown in position leading to a step, and in various embodiments; and FIG. 10 is a simplified cross-sectional view showing further details of a portion of the surface of the ramp of FIG. 5, and FIG. 11 is a simplified cross-sectional view of molds suitable for forming sections of the modular ramp of the present invention.

DETAILED DESCRIPTION OF THE PREFERRED EMBODIMENT

FIG. 1 is a simplified plan view of modular ramp 10 according to the present invention. Modular ramp 10 comprises multiple sections 101–113. In general, it is desirable that all of the sections of the ramp except first section 101 have the same length along the ramp. First section 101 forming the first and lowest section of the ramp may be of the same or different length than remaining sections 102–N, where N is the total number of sections. For example, first section 101 is shown having length 12 and all subsequent sections 102–N are shown having substantially identical lengths 14. The total length $L_T$ of the ramp (identified by reference number 16 on FIG. 2) is the sum of the lengths of the individual sections, that is:

$$L_T = L_1 + (N-1) \times L_n, \tag{1}$$

where $L_1$ is the length of the first section indicated in FIGS. 1–2 by reference number 12, $L_n$ is the length of each subsequent section, indicated by reference number 14, and N is the total number of sections. If all sections including the first are of the same length, then:

$$L_T = N \times L_n. \tag{2}$$

Each section 102–N has the same rise 15. The "rise" of a ramp section is the difference in height between the beginning and end of the section along the ramp. It is desirable that each section (and the ramp as a whole) have about a 1:12 slope, that is, the ratio of rise 15 to length 14 is about 1:12, but this is not essential. Other slopes may also be used, but a 1:12 slope is particularly convenient for ramps intended to be utilized by wheel chairs.

For ramps intended for use by wheel chairs and other wheeled equipment, it is desirable that surface 16 adjacent upper edge 18 of ramp 10 be level with upper surface 20 of curb or step 22 within about ¼ inch, that is, that the mis-match between height 24 of upper edge 18 and height 26 of curb or step 22 be about $+/-\frac{1}{4}$ inch or less. This mis-match is sufficiently small that wheel chairs and other wheeled carts or tables can roll over such a discontinuity without significant difficulty. As those of skill in the art will appreciate, larger or smaller discontinuities may be tolerable for particular circumstances.

By making length 14 of sections 102-N about six inches per section and rise 15 about ½ inch per section, then a 1:12 slope is provided with a modular ramp arrangement that will match any curb step or threshold height within ¼ inch in a very convenient manner. For example, for a ramp such as is illustrated in FIGS. 1-2 where N=13, and with each section of 1:12 slope, and assuming that $L_n=6$ inches and $L_1=2\times L_n$ then height 24 is $[(6/12)\times(13-1)+(2\times 6/12)]=7$ inches and $L_T=7$ feet. Thus, curb height 26 can be 6¾ inches to 7¼ inches and have no more than a ¼ inch mismatch to the ramp. If section 113 is omitted, then the upper edge 18' of ramp 10 now has a height of 6½ inches, thereby approximately matching curbs or steps in the range 6¼ inches to 6¾ inches. If section 112 is omitted, then upper edge 18" of ramp 10 now has a height of 6 inches, thereby approximately matching curbs or steps in the range 5¾ to 6¼ inches, and so forth.

Based on this example, those of skill in the art will understand that inclusion or omission of each such modular ramp section adds or subtracts ½ inch from the height of the upper edge of the ramp, thereby insuring that any curb height can be matched within ¼ inch. Where a different maximum discontinuity is appropriate, than the rise of the modular ramp sections is adjusted accordingly. For example if a ½ inch discontinuity can be tolerated, and a 1:12 slope is still desired, then each ramp section is conveniently twelve inches long. Alternatively, with a 1:6 slope a half inch or smaller discontinuity is obtained with six inch long ramp sections. For a ⅛ inch discontinuity and 1:12 slope, the desirable section length is three inches, and so forth.

The sections comprising ramp 10 desirably have upper surfaces 27 containing grooves or serrations 29 as shown, for example, in the detail provided in FIGS. 3 and 10. As indicated by FIG. 10 it is desirable that grooves 29 have a cross-section such that they are wider at the top so that if ice forms therein it will not fracture the ramp surface. Surface grooves 29 provide an anti-skid characteristic, but any other form of anti-skid surface may be utilized, including but not limited to, a sand loaded surface, a rubberized surfaces, a textured surface and combinations thereof. Those of skill in the art will understand how to choose or apply suitable non-skid surfaces.

FIG. 4 shows a view looking at the upper end of ramp 10, that is, the end of ramp 10 that abuts step or curb 22. Edge 18 has height 24 above base or ground level 11. Ramp 10 desirably has raised sides 30 of thickness 32. Ramp 10 is of width 28 between sides 30. Sides 30 help prevent wheel chairs or other wheeled apparatus from rolling off the side of ramp 10 and are a desirable but not essential safety feature. Typical values of ramp width 28 are two feet to six feet or larger, depending upon the nature of the wheeled traffic. For one-way wheel chair traffic, a three foot wide ramp is generally adequate, but larger or smaller widths can also be used. For cosmetic and cleanliness purposes it is desirable that sides 30 extend to ground level 11. This prevents trash and other debris from accumulating in open spaces beneath ramp 10.

FIGS. 5-10 are cross-sectional views showing further details of the construction of ramp 10 according to various embodiments. FIGS. 5-8 show ramps 38-41 having six sections, as would be obtained for example, from the fist six sections of the ramp of FIGS. 1-2. Ramps 38-41 are in position against curb or step 44 having upper surface 46 of height 48 above base 11 on which ramps 38-41 rests. Ramps 38-41 illustrate different cross-sectional shapes for sections 101-N, according to different embodiments of the present invention. FIG. 10 shows a few sections of a still further embodiment of the ramp of the present invention.

FIG. 5 illustrates an arrangement where each section 101-N has at least two supporting legs, as for example, legs 50, 51, 52 of first section 101 and legs 53, 54 of representative further section 103. Thus, the various sections of ramp 38 are free standing, that is, each ramp section stands upright and are self-supporting without being connected to another ramp section. The various ramp sections are conveniently jointed by attaching one section to another, arranged in increasing height.

Since the height of the lower edge of each section is designed to match the upper edge of the preceding section and the height of the upper edge of each section is designed to match the lower edge of the following section, when assembled the sections form a ramp with a substantially continuous upper surface. The sections may be joined to each other and to base 11 by adhesive, screws, rivets, bolts, nails or other common connection technique. For example, bolt 56 is illustrated as coupling legs 54, 55 and screw 58 is shown as extending from one section to another from upper surface 27. However these are intended to be examples of attachment means and not limiting.

It is further desirable to apply an adhesive between the feet of the ramp legs (e.g., legs 51-55, etc.) and base 11 to prevent lateral movement of ramp 38, but this is not essential. In addition or in the alternative, spikes or tie rods 59, 60 may be driven or drilled into base 11 to attach ramp 38 firmly to base 11. By way of example, spike 59 passes though leg 51 (or any other leg) and spike 60 passes through an open space between legs 61, 62 (or any other space). Either arrangement or a combination thereof is suitable. While the joining of the various ramp sections together is illustrated in FIGS. 1 and 5-8 and the attachment of the ramp sections to the ground or other base is illustrated in FIG. 5, those of skill in the art will understand based on the description herein that such attachments are intended to apply to and be useful with all embodiments of the ramp sections even though fasteners are not particularly illustrated in connection with all of the embodiments shown in FIGS. 2 or 5-10.

It is desirably but not essential that self-supporting sections such as are shown in FIG. 5 interlock. For example, section 101 of FIG. 5 is shown as having lip 70 that engages groove 72 of section 102, and similar lips and grooves are provided on subsequent sections 102-N. In this way each section strengthens then next and a more rigid and sturdy ramp is obtained. As used herein, the word "groove" is intended to include any form of recess or aperture or ledge adapted to receive a mating lip and the word "lip" is intended to include any form of protrusion or tongue adapted to mate with a groove, and neither is intended to be limited to the particular examples illustrated herein for convenience of explanation.

In the embodiment of FIG. 5, lip 70 is shown as being adjacent the higher or up-hill edge of each section and groove 72 adjacent the lower or down-hill edge of each section. Ramp 39 of FIG. 6 is substantially the same as ramp 38 of FIG. 5 except that lips 74 are adjacent the lower or down-hill edge of the ramp sections and grooves 76 are adjacent the higher or up-hill edge of the ramp sections. Either arrangement maybe used. However, a desirable feature of the arrangement of FIG. 5, is that a lip protrudes from the upper edge of the last section and therefore is available to abut smoothly against step 44, whereas with the arrangement of FIG. 6, there is a groove in the corresponding location, thereby creating a small gap. It is desirable to fill this small gap with supplementary strip 78 which may be cemented in place with construction adhesive.

FIGS. 7 and 8 illustrate two further embodiments of the present invention. In the embodiment of FIG. 7, first section 101 of ramp 40 has two supporting legs 50-51 similar to those shown for ramps 38-39, but subsequent ramp sections 102-N have only one supporting leg 82-N each. In the embodiment of ramp 40, lip 88 is provided at the higher or up-hill edge of each ramp section. Lip 88 mates with groove 89 at the lower or down-hill edge of the next ramp section. First section 101 has no groove in this implementation. Grooves 89 are located above supporting legs 82-N of each section, so that the weight transfer-red via lip 88 from one section to the next is placed directly above the supporting leg. Bridging portion 90 of each section extends between its supporting leg and lip 88 of the same section which rests on the groove located above the leg of the next section. Multiple bridging portions 90 form the smooth continuous surface of the ramp. Sections 102-N of ramp 40 are conveniently joined by adhesive placed between lip 88 and groove 89. Screws, nails, bolts or rivets may be placed through the overlapping lip into or though the body of the underlying groove and leg, as is shown for example, by screws or nails 91 extending through the lip of section 105 into the body and leg of section 106 (see FIGS. 1 and 5).

FIG. 8 shows another embodiment wherein, as compared to FIG. 7, the orientation and location of the legs, lips and grooves is reversed. For example, first section 101 of ramp 41 has three legs and groove 98 at its higher (up-hill) edge. Adjacent section 102 has lip 99 at its lower (down-hill) edge coupled via bridging portion 90 to supporting leg 92 located at the higher (up-hill) edge of section 92. There is a similar groove 98 located above leg 92 of section 102 on which rests lip 99 of next section 103, and so on for each subsequent section. The sections are tied together in much the same manner as for ramp 40, e.g., by bolt 93 passing through the lip of section 106 into the base and/or leg of section 105 (see FIG. 1 and 8). The same comparison exists between ramps 40 and 41 as between ramps 38-39 with respect to the lip or groove being adjacent step or curb 44. Filler strip 78 is desirable in connection with ramp 41 for the same reason as with ramp 39. As indicated by attachment means (e.g., anchor bolt) 94 in FIG. 8, any or all of ramps 10, 39-41 may be secured to step or curb 44 to prevent movement.

FIG. 9 shows in cross-section, a further embodiment of the present invention comprising ramp sections 115, 116 which, except for height, conveniently have substantially identical cross-sections. Sections 115, 116 have supporting legs adjacent the lower and upper edges of each section and grooves 117, 117'. Bridging portion 118 rests in grooves 117, 117' to provide substantially continuous upper surface 119.

Sections 101-N of FIGS. 1-8 and/or sections 115, 116 and bridging portion 118 of FIG. 9, are desirably prefabricated using mass production techniques and sent to the job site in kit form where they are assembled to fit the particular curb or step for which they are intended. There is no waste material and no need for on-the-job construction of customized pieces.

Ramp sections 101-N and 115, 116 may be fabricated of a wide variety of materials, but the nature of the design described above lends itself particularly to fabrication by casting, molding or extrusion. It will be noted that except for the first section, all of the other sections may be arranged to have a very similar cross-sectional shape but of different height. That is, the supporting legs of one section are of different height than another section, but otherwise the cross-sectional shape and location and size of the lips and grooves may be made substantially identical. It is generally not necessary to provide any cross-bracing between the legs of even the taller sections since, virtually all curbs and steps that must be matched are of less than one foot in height and most are of the order of eight inches or less. Thus, the vast majority of sections can have, except for leg height, the same cross- section and design. This greatly facilitates construction and reduces manufacturing cost since standardized jigs, dies, molds, and/or fixtures may be used.

For example, if the sections are extruded by forcing a liquid or semi-liquid plastic or filled plastic or alloy such as aluminum through a die having, for instance, a cross-sectional shape corresponding to one or the other of the cross-sections shown in FIGS. 5-9, then all of the extrusion dies have the same shape except for the leg length. By making two piece extrusion die 120, such as is shown in FIG. 11, with upper half 121 having an extrusion opening corresponding to the shortest repeated ramp section and changeable lower halves 122-126, then dies or molds may be easily and cheaply provided for all of the desired sections.

For example, upper mold or die half 121 is shown as having an extrusion opening or cavity the same as the cross-section of ramp section 102 of FIG. 5. Upper mold or die half 121 is combined with featureless lower mold or die half 122 to produce a die or mold for forming ramp section 102. By replacing featureless lower half 122 with lower half 123 having channels 123', one obtains a die of mold for section 103, and the same for each of the other sections 104-N by replacing the lower half with further lower halves having progressively deeper channels 123 . . . 126' corresponding to greater leg lengths. FIG. 10 illustrates the various dies or mold sections needed for ramp sections 102-106.

It will be noted that the more complex part of the die or mold is entirely in the upper half, which is the same and reusable, while the lower halves require only the provision of channels of different depths corresponding to the amount by which each section is taller than the preceding section. This makes for extremely simple and inexpensive tool fabrication and great economy of scale.

Even if the ramp sections are fabricated of separate pieces of wood, metal and/or plastic which are shaped and attached together, e.g., separate legs and bridging portions with appropriate lips and grooves, the manufacturing and assembly process is much simplified because all the bridging portions, lips and grooves of ramp sections 102-N are identical. The only difference is the heights of the legs. Thus, the jigs and fixtures may be substantially the same in all respects except for those factors related to leg height. The greatly facilitates manufacturing economy.

A particular feature of the present invention is that the ramp sections may be prefabricated and easily shipped as a kit of parts for assembly on location. If the ramp sections are molded, cast or extruded, then the kit consists of a first (lowest) section, which may be of the same or different cross-section than the others, and however many additional sections are needed by the user to match his curb or step. Those of skill in the art who are familiar with shipping construction materials will appreciate based on the description herein, that because of their generally U-shaped or L-shaped or flat cross-sections, the various ramp sections can be interleaved to form a package of comparatively small size.

In a further embodiment, the ramp sections are made up of two or three pieces, that is, a standardized bridge portion 90 with integral lips and grooves which is the same for all repeated sections, and one or two legs per section, the leg(s) and the bridging portion to be joined at the job site. Where one leg is used, one obtains the arrangement illustrated in FIGS. 7-8 but with an additional joint where the leg attaches to the bridging portion. Where two legs are used, one obtains the arrangement illustrated in FIGS. 5-6 but with additional joints where both legs attach to the bridging portion. In either case, the prefabricated pieces may be packed for shipping into a substantially solid mass with almost no waste space at all, and there is no waste material or custom fitting required at the job site. The ability to be packed into small volumes for shipment is a particular feature of the present invention-which is of great practical utility.

In view of the foregoing description, those of skill in the art will appreciate that the present invention provides a modular ramp and ramp kit which utilizes modular sections of substantially similar cross-section (except for height). These ramp sections can be manufactured easily and simply with great economy of scale because of the modular and repetitive nature of the shape of the various ramp sections.

The modular design and construction allows the user to match any given curb or step height within a fraction of an inch using standardized prefabricated sections. The prefabricated sections assemble easily without waste material or custom construction at the job site. The prefabricated sections are compact and easy to ship. The total volume and weight of goods that must be shipped to the job site is substantially reduced.

In addition, the invented ramp sections and method are adapted to provide ramps having a slope and surface suitable for use by wheel chairs. The modular ramp of the present invention is particularly well suited to retrofit installation for bringing existing structures into conformance with the ADA because it enables curbs or steps of many different heights to be accommodated by assembling predetermined numbers of standardized, prefabricated ramp sections without custom construction.

While the present invention has been illustrated in terms of particular structures, materials and arrangements, many variations and equivalents will occur to those of skill in the art based on the teachings herein, and it is intended to include these variations and equivalents in the claims that follow.

What is claimed is:

1. A modular ramp, comprising, a plurality of separate sections which form a substantially continuous ramp when assembled edge to edge, wherein each section after a first section has opposed first and second edges and a substantially similar length along the ramp between the opposed first and second edges and only one supporting member per section, said supporting member being located in proximity to the second edge, there being a lip near the first edge and a groove near the second edge, the first and second edges of a section being different in height when the sections are assembled, and wherein when sections are placed edge to edge a lip of one section engages a groove of the adjacent section to thereby form the substantially continuous ramp, and wherein the ramp is assembled each section is substantially of inverted L-shape in cross-section in a plane parallel to the length and substantially perpendicular to the ramp.

2. A kit of parts which when assembled form a ramp, comprising, a plurality of separate sections each of which has substantially similar length along the ramp between opposed first and second edges, there being a lip near the first edge and a groove near the second edge and a single supporting leg adjacent the second edge, the first and second edges of a section having different heights when the parts are assembled to form the ramp, and wherein when sections are placed edge to edge a lip of one section engages a groove of the adjacent section to provide a substantially continuous ramp, and wherein each section has an L-shaped cross-section.

3. The kit of parts of claim 2 wherein the length per section of each section after a first section is about twelve times the different in height between the first and second edges of the section when the parts are assembled to form the ramp.

4. The kit of parts of claim 3 wherein the length of each section after a first section is about six inches.

5. The kit of parts of claim 2 wherein the sections after a first section have, except for height, substantially the same cross-section in a plane parallel to their length along the ramp and substantially perpendicular to the ramp.

* * * * *